(12) United States Patent
Long et al.

(10) Patent No.: US 12,738,811 B2
(45) Date of Patent: Sep. 15, 2026

(54) SEAL FOR ELECTRIC MACHINE

(71) Applicant: DEERE & COMPANY, Moline, IL (US)

(72) Inventors: Randall L. Long, Coffeyville, KS (US); Stacy K. Worley, Coffeyville, KS (US); Cayle D. Harmon-Moore, Independence, KS (US)

(73) Assignee: DEERE & COMPANY, Moline, IL (US)

( * ) Notice: Subject to any disclaimer, the term of this patent is extended or adjusted under 35 U.S.C. 154(b) by 200 days.

(21) Appl. No.: 18/807,504

(22) Filed: Aug. 16, 2024

(65) Prior Publication Data

US 2025/0125688 A1 Apr. 17, 2025

Related U.S. Application Data

(60) Provisional application No. 63/589,670, filed on Oct. 12, 2023.

(51) Int. Cl.
*H02K 9/197* (2006.01)

(52) U.S. Cl.
CPC .................................. *H02K 9/197* (2013.01)

(58) Field of Classification Search
CPC .......... H02K 9/197; H02K 9/19; H02K 9/193; H02K 9/20; H02K 2201/03; H02K 3/32; H02K 3/34; H02K 3/345; H02K 3/38
USPC ........................................ 310/86, 52, 54, 58
See application file for complete search history.

(56) References Cited

U.S. PATENT DOCUMENTS

| | | | | |
|---|---|---|---|---|
| 5,800,302 | A | 9/1998 | Werre | |
| 7,530,912 | B2 | 5/2009 | Kramer | |
| 8,110,958 | B2 * | 2/2012 | Kalavsky .............. | H02K 5/128 310/85 |
| 10,170,959 | B2 | 1/2019 | Anderson et al. | |
| 11,166,410 | B1 | 11/2021 | Bonny | |

(Continued)

FOREIGN PATENT DOCUMENTS

| | | | |
|---|---|---|---|
| CN | 212868332 | U | 4/2021 |
| DE | 102013211801 | A1 | 12/2014 |

(Continued)

OTHER PUBLICATIONS

Machine translation of DE-102019218446-A1. (Year: 2021).*

(Continued)

*Primary Examiner* — Michael Andrews
(74) *Attorney, Agent, or Firm* — KLINTWORTH & ROZENBLAT LLP

(57) ABSTRACT

A gap seal for an electric machine having a rotor rotatable about a rotation axis and separated from a stator by an annular gap. The gap seal includes an annular body defining a radial ring and an axial ring joined to the radial ring as a unitary part. The radial ring extending in a radial plane and the axial ring extending in a direction of the rotation axis. The radial ring and the axial ring each define an inner surface, the inner surface of the axial ring is configured and positioned to abut an annular axial peripheral surface of the rotor and provide a sliding seal, and the inner surface of the radial ring is configured and positioned to abut a radial peripheral surface of the stator and provide a static seal, wherein the sliding seal and the static seal cooperate to provide a liquid-tight seal of the annular gap.

20 Claims, 11 Drawing Sheets

(56) References Cited

U.S. PATENT DOCUMENTS

| | | | | |
|---|---|---|---|---|
| 2003/0085628 | A1 | 5/2003 | Miyazaki et al. | |
| 2004/0090137 | A1* | 5/2004 | Bildstein | H02K 5/128 310/214 |
| 2012/0025636 | A1* | 2/2012 | Roopnarine | H02K 3/50 310/46 |
| 2014/0062229 | A1 | 3/2014 | Smetana | |
| 2020/0127516 | A1 | 4/2020 | Ohzu et al. | |
| 2020/0173535 | A1 | 6/2020 | Peng et al. | |
| 2021/0066999 | A1 | 3/2021 | Taupeau et al. | |
| 2021/0122227 | A1 | 4/2021 | Bindl et al. | |
| 2021/0309099 | A1 | 10/2021 | Long | |
| 2022/0299087 | A1 | 9/2022 | Kobayashi et al. | |
| 2022/0385152 | A1* | 12/2022 | Engelhardt | H02K 3/345 |
| 2024/0288050 | A1 | 8/2024 | Okada et al. | |

FOREIGN PATENT DOCUMENTS

| | | | | |
|---|---|---|---|---|
| DE | 102015007588 | A1 | 12/2016 | |
| DE | 102019218446 | A1 * | 6/2021 | H02K 99/20 |
| DE | 102022116212 | A1 | 1/2023 | |
| DE | 102022209152 | A1 | 3/2023 | |
| DE | 102023110464 | B4 | 11/2024 | |
| EP | 1916758 | A2 | 4/2008 | |
| EP | 2546964 | A2 | 1/2013 | |
| TW | 201208237 | A | 2/2012 | |
| WO | WO 2013189649 | A1 | 12/2013 | |
| WO | WO 2022102219 | A1 | 5/2022 | |

OTHER PUBLICATIONS

German Search Report issued in application No. 102024126329.6 dated Jul. 15, 2025, 06 pages.

Car Buzz, Jacob Oliva, New EV Motor Company Has an In-Wheel Motor That Makes Insane Torque, https://carbuzz.com/electric-vehicles-orbis-halodrive-in-wheel-motor/, accessed Aug. 8, 2025, 11 pages.

Orbis Electric, Halodrive In-Wheel Axial Flux Motor, https://www.orbiselectric.com/halodrivein-wheel, accessed Aug. 25, 2025, 2 pages.

German Search Report issued in application No. 102024126354.7 dated Feb. 26, 2025, 08 pages.

German Search Report issued in application No. 102024126359.8 dated Feb. 20, 2025, 10 pages.

Non Final Office Action issued in U.S. Appl. No. 18/807,521 dated Jun. 26, 2025.

Non Final Office Action issued in U.S. Appl. No. 18/807,478 dated Mar. 26, 2025.

* cited by examiner 130
132
134
135
136
137
138
142
144
146
148
150
154
156
158
160
162
164
168
170
172
174
178
179
180
182
184
186
188
190
C
S1
S2
P1
P2

SEAL FOR ELECTRIC MACHINE

CROSS-REFERENCE TO RELATED APPLICATION(S)

The present application claims the benefit and priority of U.S. Provisional Application No. 63/589,670, entitled SEAL FOR ELECTRIC MACHINE, filed Oct. 12, 2023, the disclosure of which is incorporated by reference herein in its entirety.

STATEMENT OF FEDERALLY SPONSORED RESEARCH OR DEVELOPMENT

Not applicable.

FIELD OF THE DISCLOSURE

This disclosure generally relates to a seal in an electric machine.

BACKGROUND OF THE DISCLOSURE

Electric machines, such as motors, generators, and motor-generators, may be utilized for various industrial, commercial, and residential applications. Electric machines include electric motors that convert electrical energy into mechanical energy and electric generators that convert mechanical energy into electrical energy. Electric machines may include a rotor and a stator. Electric machines are utilized as drive components for electrical vehicles, including electric turf, agricultural, mining, forestry, and construction work vehicles. Some examples of work vehicles are loaders of various types, tractors, and excavators. The amount of space the electric machine and/or gearing system can occupy on a work vehicle can at times be limited. Increasing the power density by volume of the motor and gearing system can allow for the motor and gearing system to fit in a more compact volume on the work vehicle.

SUMMARY OF THE DISCLOSURE

In one implementation, a gap seal for an electric machine having a rotor rotatable about a rotation axis and separated from a stator by an annular gap is disclosed. The gap seal comprising an annular body disposed concentrically about the rotation axis. The annular body defining a radial ring and an axial ring joined to the radial ring as a unitary part. The radial ring extending in a radial plane intersecting the rotation axis and the axial ring extending in a direction of the rotation axis. The radial ring and the axial ring each define an inner surface. Some or all of the inner surface of the axial ring is configured and positioned to abut an annular axial peripheral surface of the rotor and provide a sliding seal therewith. Some or all of the inner surface of the radial ring is configured and positioned to abut a radial peripheral surface of the stator and provide a static seal therewith, wherein the sliding seal and the static seal cooperate to provide a liquid-tight seal of the annular gap.

In an example of the gap seal, the radial ring includes a first material, and the axial ring includes the first material and a second material surrounded by the first material. In a further example of the gap seal, the second material abuts against the annular axial peripheral surface of the rotor. In a further example of the gap seal, the second material is more rigid than the first material.

In a further example of the gap seal, the radial ring further comprises retainers, wherein the retainers are circumferentially spaced around the radial ring and extend away from the radial ring. In a further example of the gap seal, the stator includes circumferentially spaced windings, wherein the windings define slots between the windings, and wherein the retainers are positioned between the windings to seal the slots between the windings. In a further example of the gap seal, a potting material is impregnated onto the windings and the retainers. In a further example of the gap seal, the radial ring further includes circumferentially spaced tabs positioned radially outside of the retainers. In a further example of the gap seal, the electric machine further includes a seal tensioner, wherein each tab is mechanically coupled to the seal tensioner, and wherein the seal tensioner keeps the gap seal in position covering the annular gap during rotation of the rotor.

In a further example of the gap seal, the gap seal is enclosed inside the electric machine. In a further example of the gap seal, the electric machine further includes a cooling fluid being pumped through the rotor and the gap seal keeps the cooling fluid out of the annular gap.

In one implementation, an electric machine is disclosed. The electric machine includes a housing, a stator positioned within the housing, and a rotor positioned within the housing and separated from the stator by an annular gap, the rotor rotatable about a rotation axis. The electric machine further includes a gap seal including an annular body disposed concentrically about the rotation axis. The annular body defining a radial ring and an axial ring joined to the radial ring as a unitary part. The radial ring extending in a radial plane intersecting the rotation axis and the axial ring extending in a direction of the rotation axis. The radial ring and the axial ring each defining an inner surface. Some or all of the inner surface of the axial ring configured and positioned to abut an annular axial peripheral surface of the rotor and provide a sliding seal therewith. Some or all of the inner surface of the radial ring configured and positioned to abut a radial peripheral surface of the stator and provide a static seal therewith. The sliding seal and the static seal cooperate to provide a liquid-tight seal of the annular gap.

In an example of the electric machine, the radial ring includes a first material, wherein the axial ring comprises the first material and a second material surrounded by the first material, and wherein the second material abuts against the rotor. In a further example of the electric machine, the second material is more rigid than the first material.

In a further example of the electric machine, the radial ring further includes retainers. The retainers are circumferentially spaced around the radial ring and extend away from the radial ring. The stator includes circumferentially spaced windings, wherein the windings define gaps between the windings and the retainers are positioned between the windings to seal the gaps between the windings. In a further example of the electric machine, a potting material is impregnated onto the windings and the retainers.

In a further example of the electric machine, the radial ring further comprises circumferentially spaced tabs positioned radially outside of the retainers. In a further example of the electric machine, the electric machine further includes a seal tensioner, wherein each tab is mechanically coupled to the seal tensioner, and the seal tensioner keeps the gap seal in position covering the annular gap during rotation of the rotor.

In a further example of the electric machine, the gap seal is positioned on a first end of the rotor, and the electric machine further includes a second gap seal positioned on a second end opposite the first end. The second gap seal includes a second annular body disposed concentrically about the rotation axis. The second annular body defining a second radial ring and a second axial ring joined to the second radial ring as a second unitary part. The second radial ring extending in the radial plane and the second axial ring extending in the direction of the rotation axis. The second radial ring and the second axial ring each define a second inner surface. Some or all of the second inner surface of the second axial ring configured and positioned to abut a second annular axial peripheral surface of the rotor and provide a second sliding seal therewith. Some or all of the second inner surface of the second radial ring configured and positioned to abut a second radial peripheral surface of the stator and provide a second static seal therewith. The second sliding seal and the second static seal cooperate to provide a second liquid-tight seal of the annular gap. In a further example of the electric machine, the electric machine further includes a cooling fluid being pumped through the housing, and the gap seal keeps the cooling fluid out of the annular gap.

Other features and aspects will become apparent by consideration of the detailed description, claims, and accompanying drawings.

Figure 1:
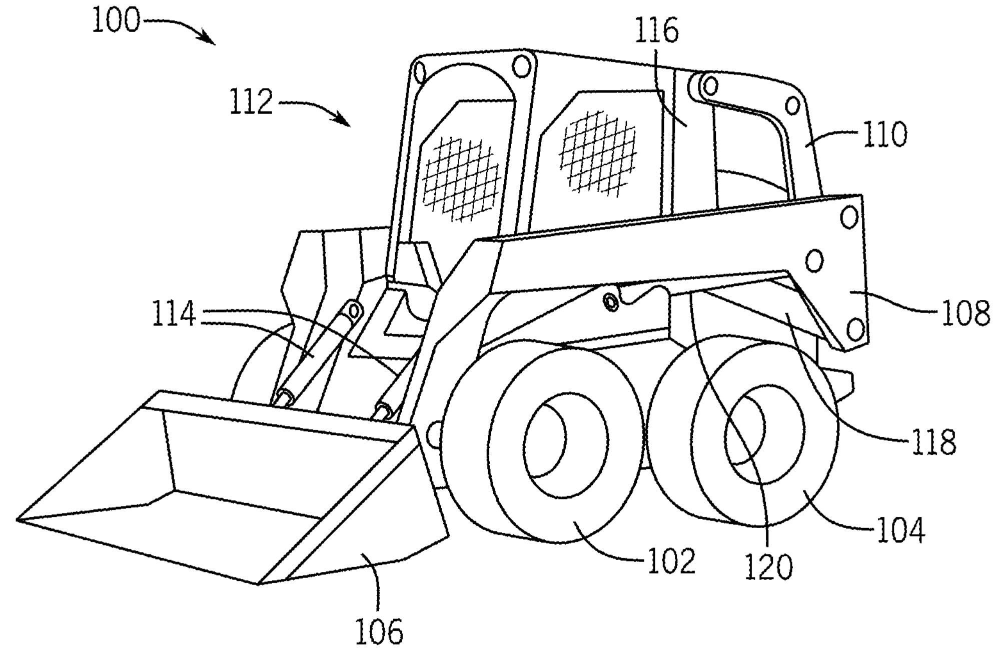
FIG. 1 is a simplified perspective view of an example work vehicle, according to at least one aspect of the present disclosure.

Throughout the drawings, identical reference numbers designate the same element. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

Example embodiments of the present disclosure are shown in the accompanying figures of the drawings described briefly above. Various modifications to the example embodiments may be contemplated by one of skill in the art without departing from the scope of the present invention, as set forth in the appended claims.

Overview

Some work vehicles require high torque and low speed to complete various tasks. Some of these work vehicles have a drive system driven by an electric machine. These electric machines commonly have an output with a low torque and high speed. To provide a high torque and low speed, the drive system can include a gear train attached to the electric machine output to decrease the speed and increase the torque. However, the gear train increases the total volume required for the drive system, which decreases the power density by volume of the drive system. In some instances, space can be limited on the work vehicle. Decreasing the space required by the motor and drive train allows the drive system to fit in a smaller volume and increases the power density by volume of the drive system.

The present disclosure provides an electric machine with increased power density by integrating the gear train into the electric machine to provide a gear reduction that increases the torque and reduces the speed of the output. In one or more embodiments, the gearing may be incorporated into or constitute the rotor or the electric machine.

An example electric machine with integrated gearing has a housing with a stator and a rotor positioned within the housing. The stator and rotor are offset from each other by an annular gap. The stator includes stator windings that produce an electro-magnetic field when energized and the rotor can include a plurality of magnets that interact with the electro-magnetic field to rotate the rotor about a drive axis. The rotation of the rotor can drive an output shaft of the electric machine. The integrated gearing can be included within the housing to be driven by the rotor and in turn drive the output shaft of the electric machine. For example, the integrated gearing can apply a gear reduction to the rotation of the rotor such that the output shaft has a lower rotation per minute (RPM) and a higher torque output than the rotor alone.

Various gear trains can be designed to be driven by the rotation of the rotor and drive the output shaft. A planetary gear arrangement is one example of integrated gearing that can be positioned within the electric machine. In this example, the rotor can be a component of the planetary gear arrangement. For example, the exterior of the rotor can be part of a ring gear or carrier of the planetary gear arrangement. This would allow the rotation of the rotor to rotate a component of the planetary gear arrangement, which would drive the planetary gear arrangement. For the planetary gear arrangement to not free wheel and function properly, a stationary component is required that allows the other planetary components to react against. For example, the stationary component could be a sun gear attached to a shaft fixed to the housing or a carrier fixed to the housing. In either case, the other planetary gear components could react against the stationary component to drive the planetary gear arrangement and rotate the output shaft. The output shaft could also be part of a component of the planetary gear arrangement. For example, the output shaft could be part of a sun gear or a carrier and rotation of the sun gear or carrier could rotate the output shaft.

One planetary gear arrangement could include a fixed sun gear, a first set of planetary gears rotating around the fixed sun gear, a second sun gear, a second set of planetary gears rotating around the second sun gear, and a carrier housing the fixed sun gear, the second sun gear, and the first and second sets of planetary gears. The output shaft can be part of the second sun gear and the rotor can be part of the carrier. The first and second sets of planetary gears can be attached to each other through the carrier by planet shafts that have the first and second sets of planetary gears rotate together. The rotation of the carrier causes the first set of planetary gears to rotate around the fixed sun gear. This causes the second set of planetary gears to rotate, which causes the second sun gear to rotate which in turn rotates the output shaft. In this planetary arrangement, the gear reduction is caused by the tooth counts on the sun gears and planetary gears. There are various alternative planetary gear arrangements that can be designed. For example, the planetary gear arrangement could also include a second carrier or a ring gear, which could be used to alter the gear reduction. Additionally, if a ring gear is added, then the fixed component could be changed from the sun gear to a carrier.

The electric machine can further include a cooling fluid in the housing. The cooling fluid cools the rotor and stator components during operation of the electric machine. In the instance of an electric machine with integrated gearing, the cooling fluid can flow through the integrated gearing. For example, if a planetary gear arrangement is positioned within a rotor of the electric machine, then the cooling fluid can flow through the components of the planetary gear arrangement. Additionally, cooling channels or cooling paths can be placed through some of the components in the planetary gear arrangement to allow the cooling fluid to flow more easily through the electric machine. For example, a carrier can have cooling channels positioned in it to allow the cooling fluid to more easily pass through the rotor. In some aspects, the cooling channels can be positioned near the magnets on the rotor to allow the cooling fluid to more easily cool the magnets during operation of the electric machine.

Cooling fluid entering the annular gap between the rotor and stator can make the electric machine inefficient. In at least one aspect, the position and angle of the motor can help keep the cooling fluid out of the gap between the rotor and stator. In an alternative aspect, a liquid-tight gap seal can be positioned over the annular gap on each end of the rotor and stator to keep the cooling fluid out of the annular gap. The seal can be positioned against the stator and extend over the annular gap to touch the rotor and provide a liquid-tight seal of the annular gap. In some aspects, the seal can also extend along the rotor. The seal can be positioned to abut a radial peripheral surface of the stator and provide a static seal therewith. The seal can also be positioned to abut an annular axial peripheral surface of the rotor and provide a sliding seal therewith. The sliding seal and the static seal can cooperate to provide a liquid-tight seal of the annular gap.

The seal can be made of a variety of materials and different materials can be positioned at different locations on the seal. For example, the seal can be formed from a radial ring that primarily abuts the stator and an axial ring that primarily abuts the rotor. The radial ring can include a first material and the axial ring can include a second material. The material selections can be made based on the type of seal formed. For example, the sliding seal against the rotor can be made with a material that is harder/stiffer than the material used for the static seal against the stator. The harder/stiffer material can allow the sliding seal to maintain its position against the rotor and keep from deteriorating against the rotating surface. In some aspects, the parts of the seal can be made from multiple materials. For example, the axial ring could have the second (stiffer) material abut the rotor and have the rest of the axial ring be covered in the first material.

One or more example embodiments of an electric machine for a work vehicle are provided in the figures of the present disclosure. The following description should be understood as merely providing a non-limiting example context in which embodiments of the present disclosure may be better understood.

Example Electric Machine for a Work Vehicle

Referring to FIG. 1, a skid steer loader 100 is an example of a work vehicle that can have a drive train driven entirely or in part electrically. Specifically, the skid steer loader 100 can include a drive train that includes at least one electric machine. For example, the drive train can include a right drive assembly and a left drive assembly, where each drive assembly includes an electric machine. The electric machines of the two drive assemblies can be operated independently to move the skid steer loader 100.

The skid steer loader 100 includes a pair of front ground engaging members and a pair of rear ground engaging members 104 for moving along the ground. The ground engaging members 102, 104 can be wheels or tracks. The ground engaging members 102, 104 on the right side of the skid steer loader 100 can be operated independently from the ground engaging members 102, 104 on the left side of the skid steer loader 100. The left drive assembly drives a front ground engaging member 102 and a rear ground engaging member 104 on the left side of the skid steer loader 100. The right drive assembly 248 drives a front ground engaging member 102 and a rear ground engaging member 104 on the right side of the skid steer loader 100. An operator can manipulate controls from inside a cab 112 to drive the ground engaging members 102, 104 on the right or left side of the skid steer loader 100 at different speeds to thereby steer and move the skid steer loader 100. For example, the operator can have the right ground engaging members 102, 104 rotate clockwise and the left ground engaging members rotate counterclockwise to turn the skid steer loader 100.

The drive assemblies can be mounted to a chassis (i.e., frame) of the skid steer loader 100. The chassis can support the components of the skid steer loader 100. For example, a main frame 116 and the front and rear ground engaging members 102, 104 are attached to the chassis.

The skid steer loader 100 can be equipped with a work implement or tool for performing a work operation. The skid steer loader 100 includes a loader bucket 106 for collecting material therein and transporting said material to a desired location. The loader bucket 106 is one of various work implements that can be attached to the skid steer loader 100. The loader bucket 106 can be pivotally coupled to a forward portion of a pair of boom arms 108 positioned on each side of the skid steer loader 100. A pair of tilt actuators 114 can extend between the loader bucket 106 and the boom arms 108 for controlling the tilted orientation of the loader bucket 106 with respect to the boom arms 108. Each tilt actuator 114 can include a cylinder rod that actuates back and forth within a cylinder in response to a hydraulic pressure. The operator can manipulate controls inside of the cab 112 to actuate the tilt actuators 114 allowing the operator to tilt the loader bucket 106 for dumping material therefrom.

In the example skid steer loader, both boom arms 108 are connected to the main frame 116 by an upper link 110 and a lower link 118. Hydraulic actuators 120 are pivotally secured at one end to the main frame 116 and coupled to the boom arms 108 at an opposite end thereof. Each hydraulic actuator 120 can include a cylinder rod that actuates back and forth within a cylinder in response to a hydraulic pressure. The operator can manipulate controls inside of the cab 112 to actuate the hydraulic actuators 120 to raise and lower the boom arms 108, which also raises and lowers the loader bucket 106.

Figure 2:
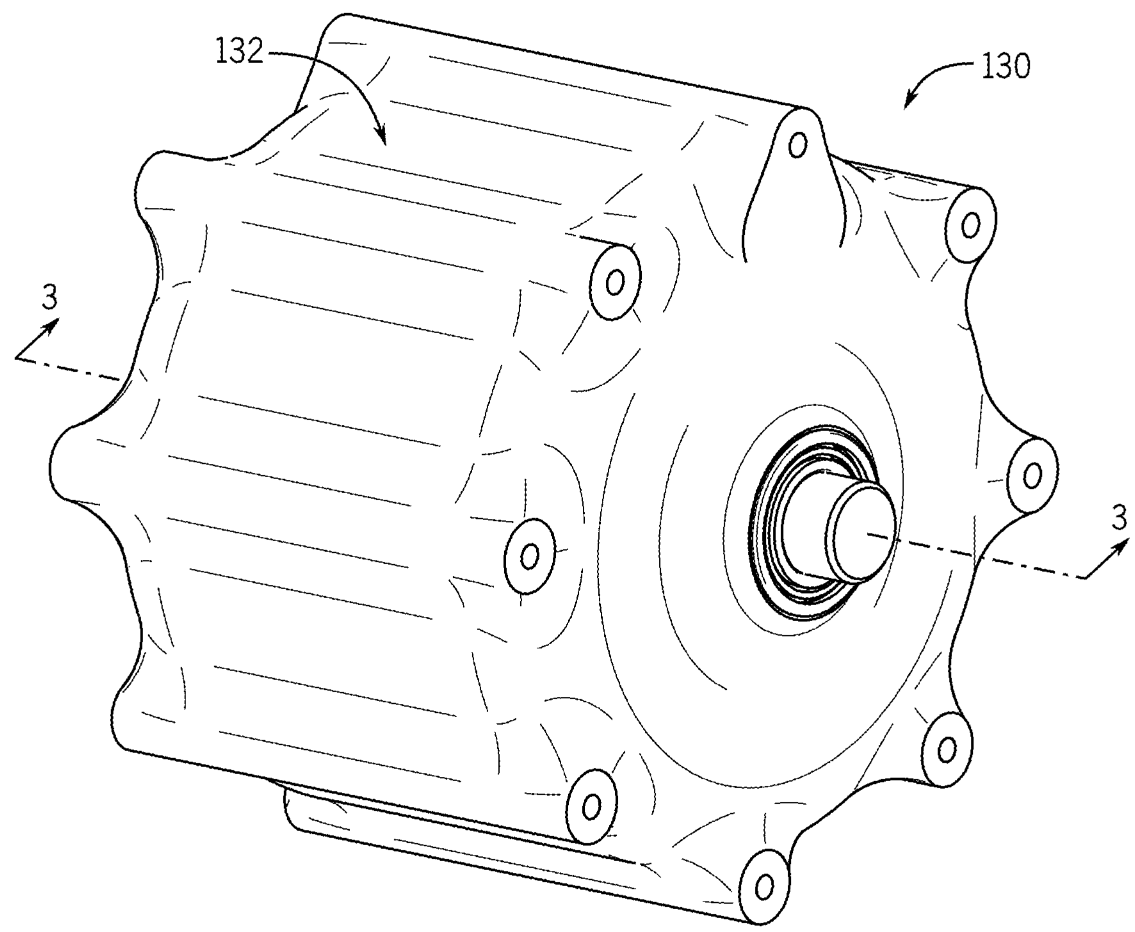
FIG. 2 is a perspective view of an example electric machine, according to at least one aspect of the present disclosure.

Referring to FIG. 2, an electric machine 130 of one or more embodiments forms part of a work vehicle (e.g., skid steer loader 100) such as an agricultural, construction vehicle or other on road or offroad vehicle, and may be utilized in an electric drive system for such work vehicles. The electric machine 130 is utilized as an electric motor and/or an electric generator in one or more embodiments.

Figure 3:
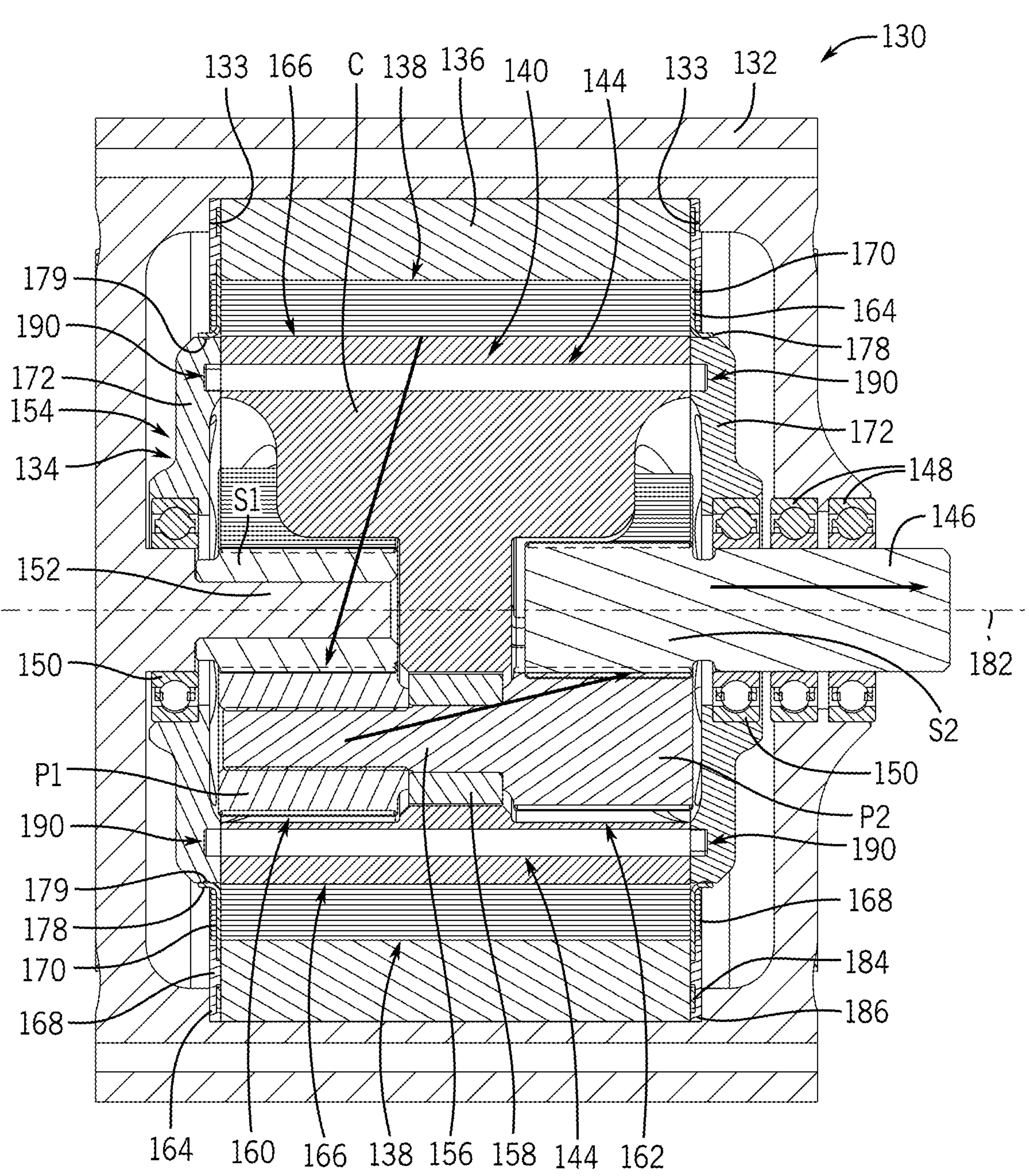
FIG. 3 is a cross-sectional view of the electric machine of FIG. 2 taken along the line 3-3 in FIG. 2.
Figure 4:
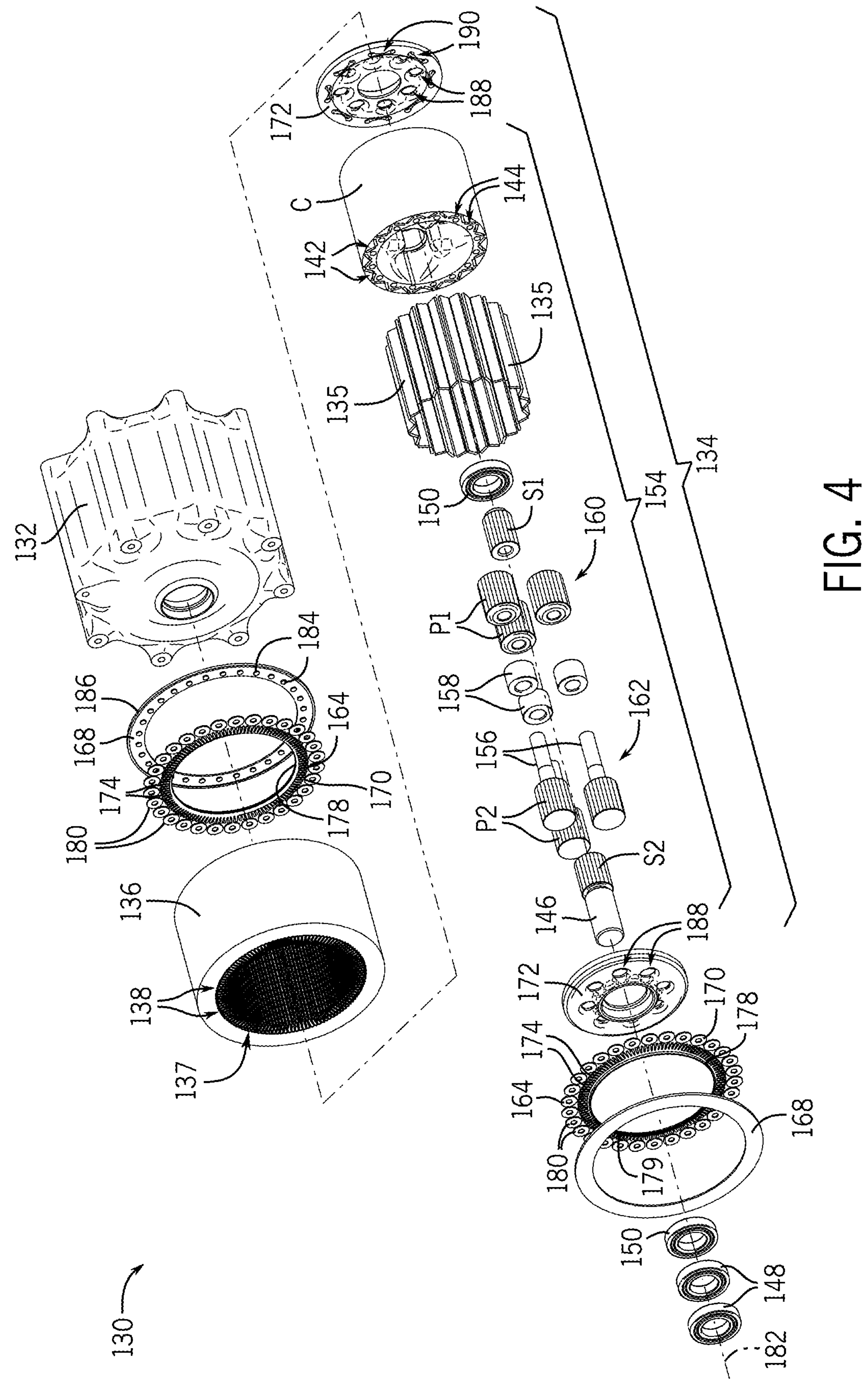
FIG. 4 is a simplified exploded view of the electric machine of FIG. 2.
Figure 5:
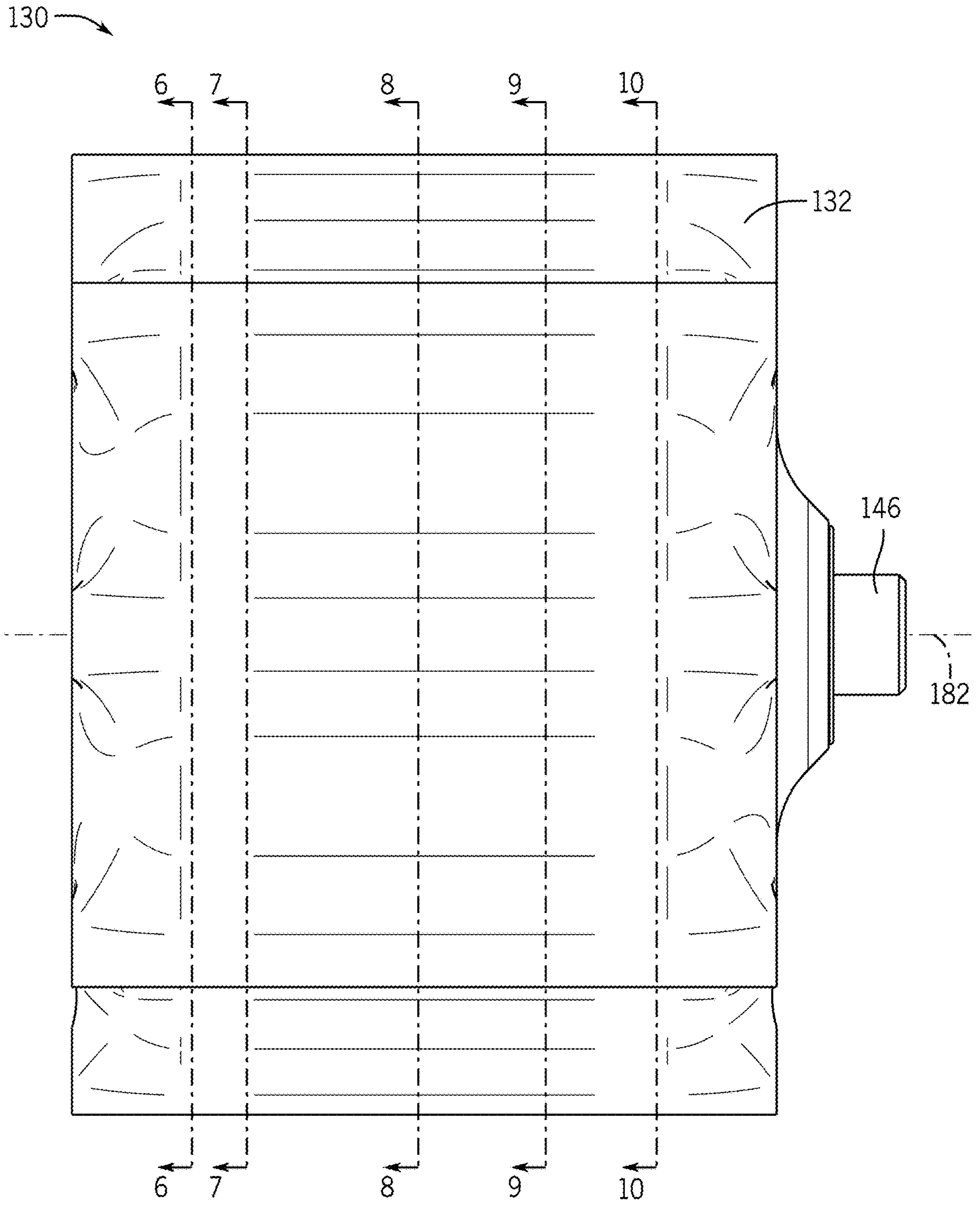
FIG. 5 is a side view of the electric machine of FIG. 2.
Figure 6:
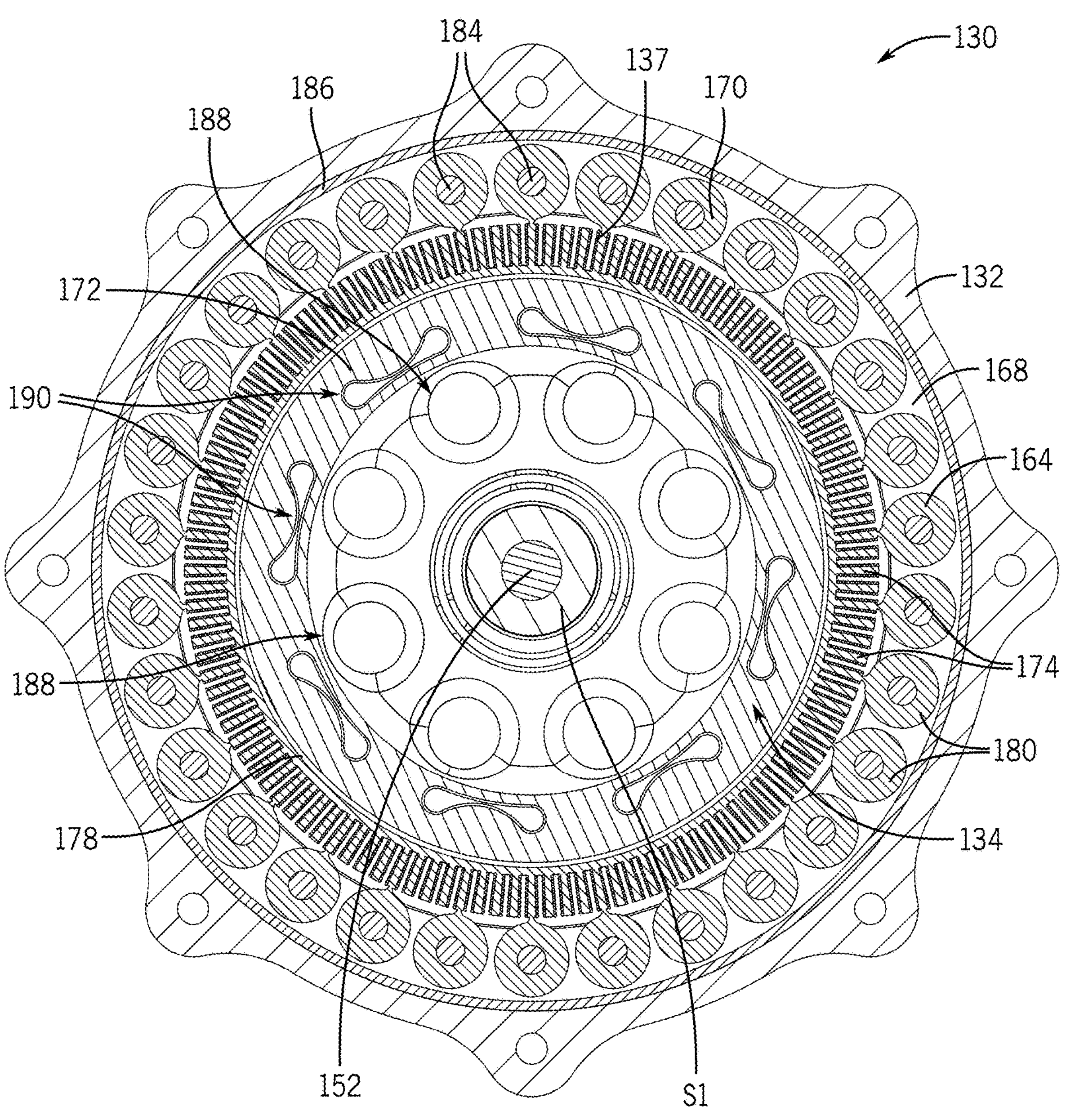
FIG. 6 is a cross-sectional view thereof taken along line 6-6 in FIG. 5.

Referring also to FIGS. 3 and 4, the electric machine 130 includes a housing 132. The electric machine 130 includes a rotor 134 and a stator assembly 136 both positioned within the housing 132. The stator assembly 136 includes windings 137 positioned in a plurality of slots 138. The rotor 134 includes a radially outer magnet portion 140 having a plurality of pockets 142 configured to position, hold, contain, or otherwise support one or more magnet(s) 135 in the illustrated embodiment. The rotor 134 and/or the electric machine 130 includes an internal permanent magnet design in the illustrated embodiment. When the stator windings 137 are energized, an electro-magnetic field is generated and the magnets 135 in/on the rotor interact with the electro-magnetic field to cause the rotor 134 to rotate within the housing 132. The power supplied to the stator windings 137 can be controlled by a controller to change the electro-magnetic field generated and control the rotation of the rotor 134. The rotor 134 further includes one or more cooling channels 144 extending axially in the illustrated embodiment. The rotor 134 and/or the stator assembly 136 may or may not be formed by axially stacked laminations or sections in one or more embodiments.

The electric machine 130 further includes a central shaft 146 extending in, at least partially through, and outwardly from the housing 132. The electric machine 130 further includes one or more shaft bearing(s) 148 and one or more rotor bearing(s) 150. The electric machine 130 further includes a reaction shaft 152 that may be fixed with, connected to, and/or integrally formed with the housing 132. In at least one aspect, the reaction shaft 152 can include a wider section and a narrower section. The wider section can be positioned within a rotor bearing 150 and the narrower section can extend into the rotor 134. The rotor 134 is supported within the housing 132 by the reaction shaft 152 and the central shaft 146. For example, the reaction shaft 152 and central shaft 146 both extend through a rotor bearing 150 and support the rotor 134 within the housing 132. The rotor bearings 150 allow the rotor 134 to rotate at a different speed than the central shaft 146 or reaction shaft 152. The central shaft 146 extends through one or more shaft bearing(s) 148 that allow the central shaft 146 to rotate relative to the housing 132 as the central shaft 146 extends through the housing 132. The one or more shaft bearing(s) 148 keep the central shaft 146 in alignment to support the rotor 134.

The electric machine 130 of one or more embodiments includes at least one wiring harness (not shown), electronic controller (not shown), and/or other components/elements to supply, receive, modify, convert, control, and/or otherwise handle power and/or signal electrical current to/from the stator assembly 136. Such components/elements not illustrated may be formed with the housing 132 or another element of the machine 130 or located separately from the housing 132 or another element of the machine 130. These components/elements can be used to control and energize the stator windings 137 to produce the electro-magnetic field.

Referring also to FIGS. 5-9, a planetary arrangement 154 is incorporated into the electric machine 130. For example, the planetary arrangement 154 can be incorporated into the center of the rotor 134 of the electric machine 130. In at least one aspect, the rotor 134 is defined by one or more components of the planetary arrangement 154. The rotor 134 includes the planetary arrangement 154, the one or more magnets 135, rotor ends 172 positioned on opposing ends of the rotor 134, and rotor bearings 150. The planetary arrangement 154 includes a carrier C, planetary gears P1, a first sun gear S1, planetary gears P2, and a second sun gear S2. The sun gear S1 is fixed, at least against rotation, to the reaction shaft 152. For example, the sun gear S1 can be mechanically coupled to the reaction shaft 152 with splines or the like, or the sun gear S1 can be integrally formed as part of the reaction shaft 152. A first planetary gear set 160 includes a plurality of planet gears P1. The planet gears P1 are meshed with the sun gear S1. A second planetary gear set 162 includes the plurality of planet gears P2. The planet gears P2 are meshed with the second sun gear S2. The second sun gear S2 is on or fixed with the central shaft 146. For example, the second sun gear S2 can be mechanically coupled to the central shaft 146 with splines or the like, or the second sun gear S2 can be integrally formed as part of the central shaft 146.

Each planet gear P1 is mechanically coupled to a planet gear P2 by a planet shaft 156. Each planet shaft 156 extends axially through the carrier C from the planet gear P1 to the planet gear P2. For example, the planet gear P1 is in axial alignment with the planet gear P2. In one aspect, the planet shaft 156 can be integrally formed as part of either the planet gear P1 or the planet gear P2 and then be mechanically coupled to the respective other planet gear P2 or planet gear P1 by splines or the like. In an alternative aspect, the planet shaft 156 can be mechanically coupled to both the planet gear P1 and the planet gear P2 by splines or the like. The planet shaft 156 mechanically couples the plant gear P1 with the planet gear P2 so that the planet gears P1 and P2 rotate together.

The planet shaft 156 extends axially through a planet shaft bearing 158, where the planet shaft bearing 158 is positioned between the planet gear P1 and the planet gear P2. The planet shaft bearing 158 is also positioned between the planet shaft 156 and the carrier C to allow the planet shaft 156 to rotate at a different speed than the carrier C with minimal to no friction between the planet shaft 156 and carrier C. The planet gears P1, P2 rotate with the planet shaft 156 and as such, the planet gears P1, P2 rotate at a different speed than the carrier C. In an alternative embodiment, each planet shaft 156 can pass through a bushing, journal film, or etc. instead of the planet shaft bearing 158. The bushing, journal film, or etc. would perform the same function as the planet shaft bearing 158 allowing the planet shaft 156 to rotate at a different speed than the carrier C with minimal to no friction between the planet shaft 156 and carrier C.

Figure 7:
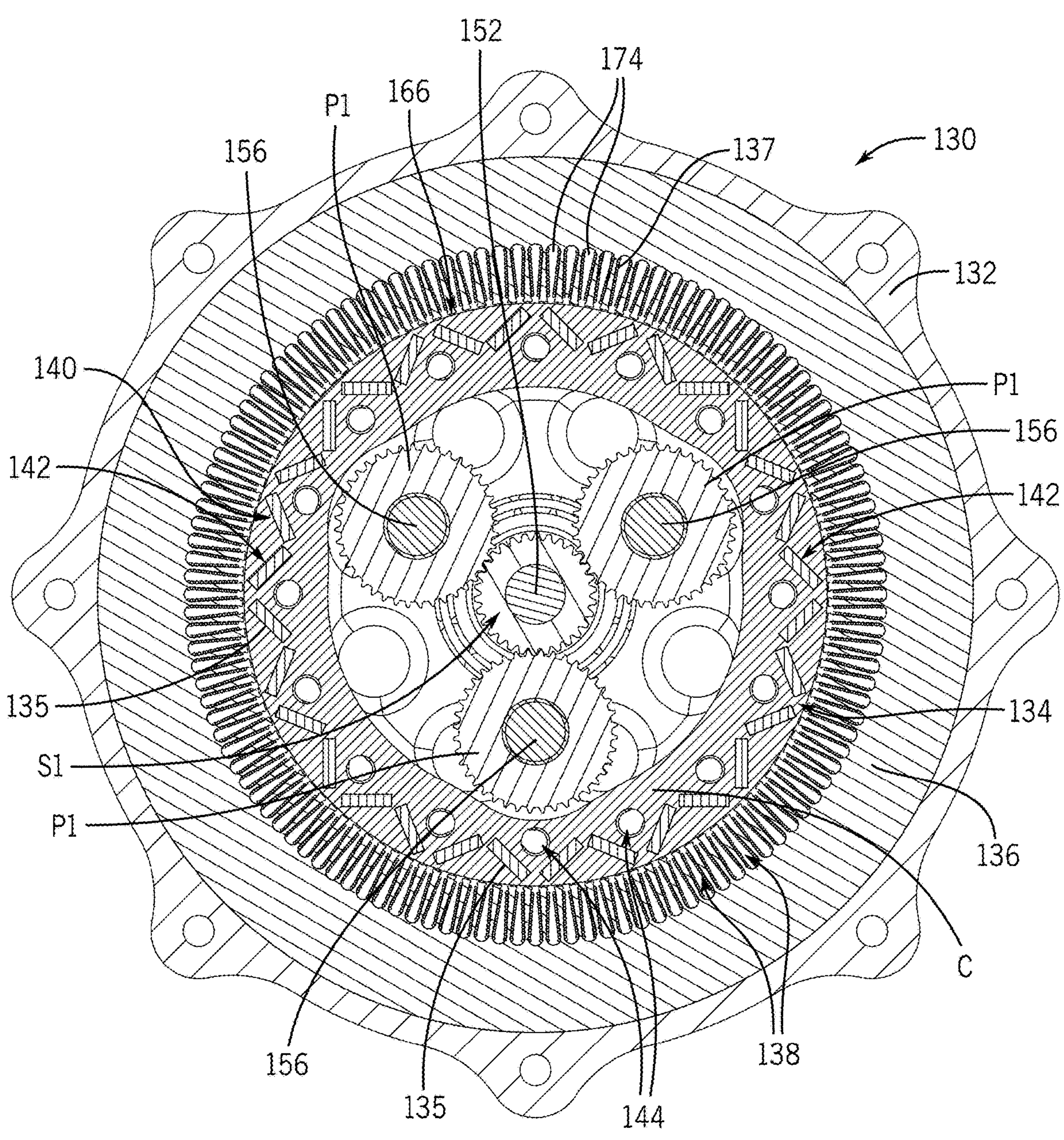
FIG. 7 is a cross-sectional view thereof taken along line 7-7 in FIG. 5.
Figure 8:
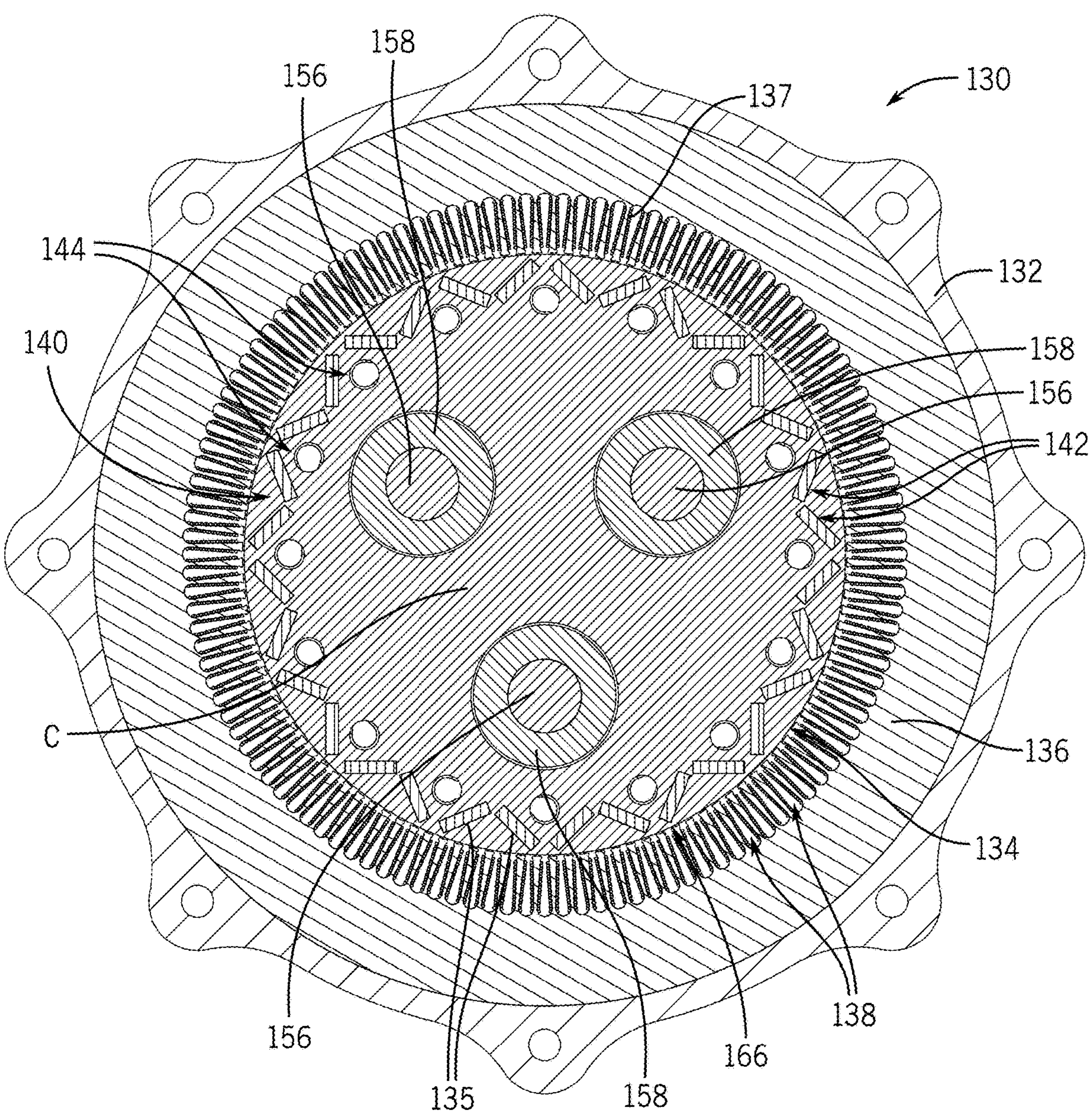
FIG. 8 is a cross-sectional view thereof taken along line 8-8 in FIG. 5.
Figure 9:
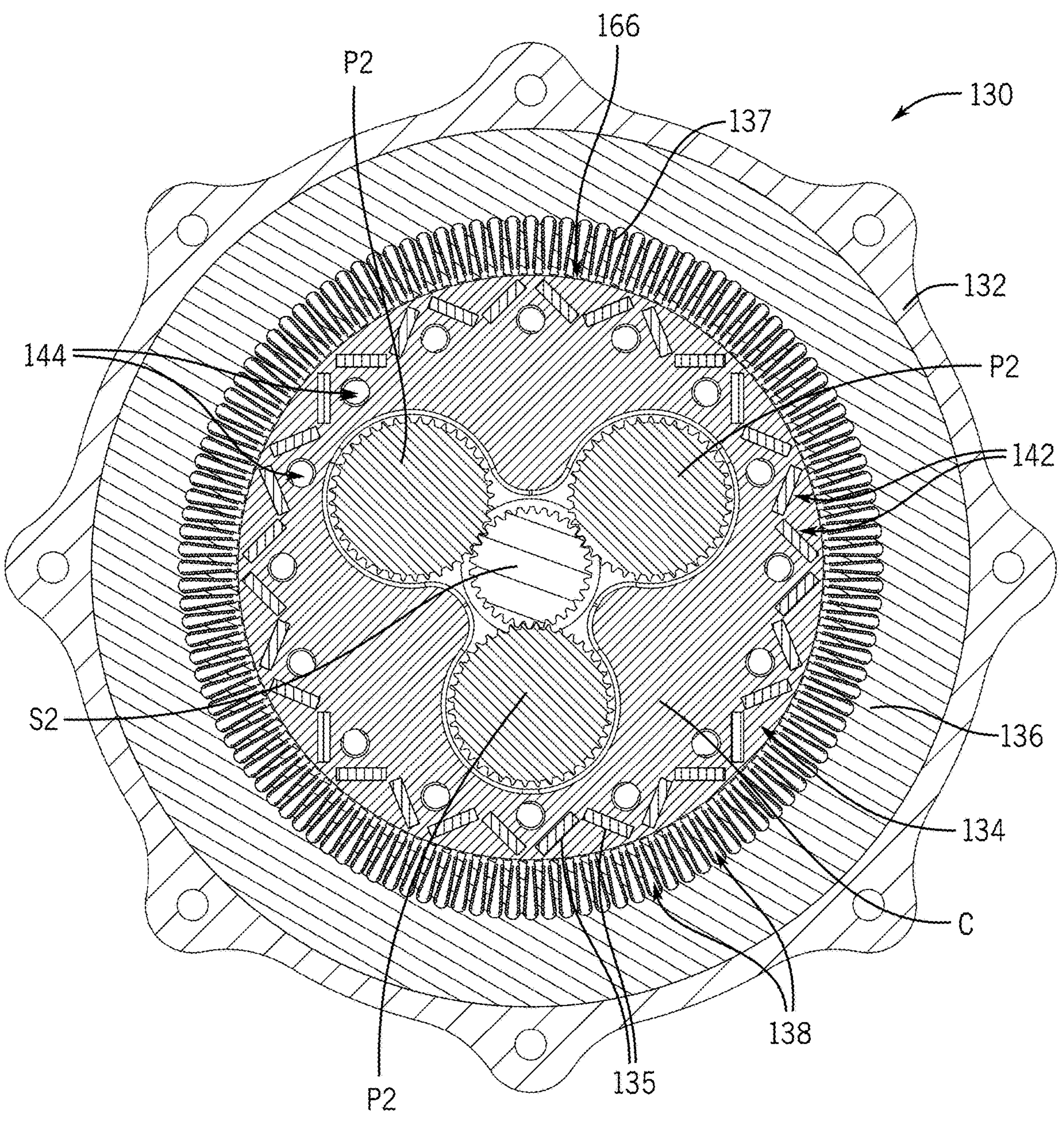
FIG. 9 is a cross-sectional view of thereof taken along line 9-9 in FIG. 5.

The carrier C is positioned axially centrally in the rotor 134 between the first planetary gear set 160 and the second planetary gear set 162. The carrier C is also positioned axially centrally between the sun gear S1 and sun gear S2. Referring also to FIGS. 7-9, the carrier C is positioned radially centrally between the first planetary gear set 160 and the second planetary gear set 162. In some aspects, the carrier C extends axially at a radially outer end to be fully or at least partially axially aligned with the first planetary gear set 160, the second planetary gear set 162, and/or the sun gear S1. The first planetary gear set 160 is positioned on one end of the carrier C and the second planetary gear set 162 is positioned on the opposite end of the carrier C.

The carrier C is fixed with or connected to rotor ends 172. The rotor ends 172 and carrier C rotate about a central axis 182. The rotor ends 172 are axially and radially fixed to the housing 132 at outer axial ends of the rotor 134. The rotor 134 can rotate on the rotor bearings 150 to allow the rotor 134 to rotate relative to the housing 132.

Referring also to FIGS. 3 and 7-9, the plurality of pockets 142 of the carrier C are designed to position, hold, contain, or otherwise support one or more magnet(s). The pockets 142 are located in the radially outer magnet portion 140 of the carrier C. The pockets 142 go through the entire carrier C. The rotor ends 172 can be positioned to keep the one or more magnets 135 in the pockets 142. The carrier C rotates due to the magnets 135 interacting with the electro-magnetic field produced by energizing the stator windings 137. The power supplied to the stator windings 137 can be controlled to change the electro-magnetic field produced which controls the rotation of the carrier C. The rotation of the carrier C applies a force to the planet shaft bearings 158 causing the position of the planet shafts 156, the planet gears P1, and the planet gears P2 to rotate around the central axis 182. The planet shaft bearings 158 allow the planet shafts 156, the planet gears P1, and the planet gears P2 to rotate relative to the carrier C with minimal to no friction with the carrier C.

The rotation of the carrier C causes the planet gears P1 to rotate around the fixed sun gear S1. The sun gear S1 being fixed to the reaction shaft 152 and the reaction shaft 152 being fixed in position relative to the housing 132. The planet gears P1 are meshing with the sun gear S1 causing the planet gears P1 to rotate relative to the carrier C. The planet gears P1 are mechanically coupled to the planet gears P2 by the planet shaft 156 such that the planet gears P1 and the planet gears P2 rotate together. The planet gears P2 are meshing with the sun gear S2. The rotation of the planet gears P2 cause the sun gear S2 to rotate. The central shaft 146 is mechanically coupled to the sun gear S2 such that the central shaft 146 and the sun gear S2 rotate together. As such, the rotation of the sun gear S2 causes the central shaft 146 to rotate.

In at least one aspect, the planetary arrangement 154 has an input of the carrier C rotating and an output of the sun gear S2 and central shaft 146 rotating. A gear reduction is applied through the planetary arrangement to increase the torque output and decrease the rotation speed of the central shaft 146. For example, the carrier C rotates at a higher RPM than the central shaft 146 and the carrier C has a lower torque than the central shaft 146. The gear reduction is produced by the tooth count of the planet gears P1 and sun gear S2 and the tooth count of the planet gears P2 and sun gear S2. By adjusting the tooth count on the gears the gear reduction can be adjusted. The gear reduction can be in the range of 1:3 to 1:50. For example, one rotation of the central shaft 146 about the central axis 182 can be caused by 33 rotations of the carrier C about the central axis 182. The rpm of the central shaft 146 is within the range of 4,000 RPM to 200 RPM and the torque at the central shaft is within the range of 4,350 Nm to 72,500 Nm during operation of the electric machine 130. As an example, the gear reduction can be a ratio of 1:7, that can take a motor torque of 1,450 Nm with a motor speed of 1,200 RPM and result in approximately 10 kNm output torque with an output speed of 171 RPM. In at least one aspect, the output torque and the output speed are at the sun gear S2 and central shaft 146.

In the case of the electric machine 130 being a motor, the input to the planetary arrangement 154 would be the rotation of the carrier C and the output would be the rotation of the central shaft 146. For example, as discussed previously, the rotation of the carrier C would be caused by the electromagnetic field produced by the stator windings 137 and the rotation of the carrier C would cause the central shaft 146 to rotate. In the case of the electric machine 130 being a generator, the input and output of the planetary arrangement 154 would be switched, where the input would be the rotation of the central shaft 146 and the output would be the rotation of the carrier C. For example, the central shaft 146 would be rotated causing the carrier C to rotate. The rotation of the carrier C would cause the magnets 135 housed in the carrier C to move relative to the stator windings 137 to generate electricity in the stator windings 137.

Figure 10:
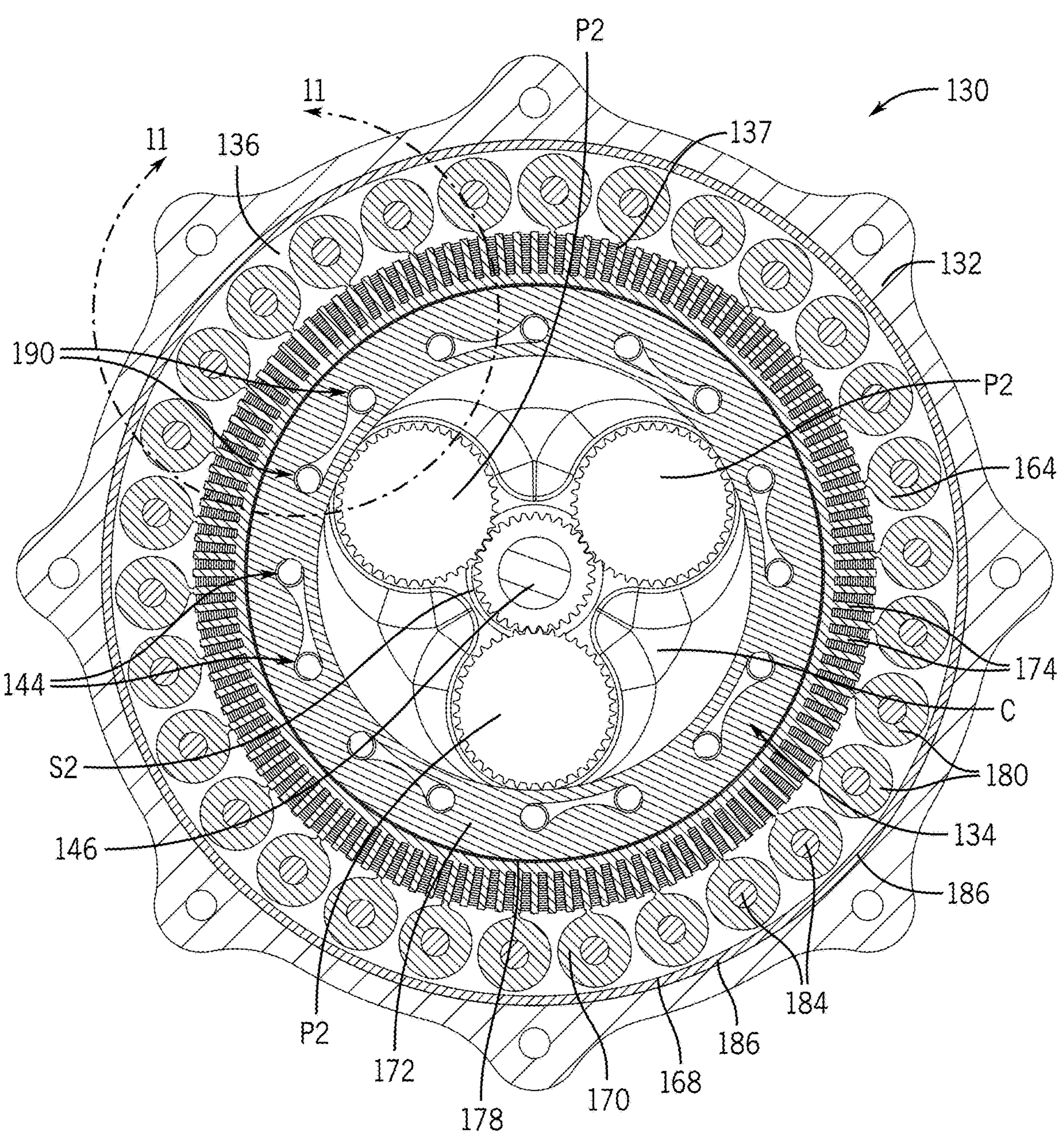
FIG. 10 is a cross-sectional view thereof taken along line 10-10 in FIG. 5.
Figure 11:
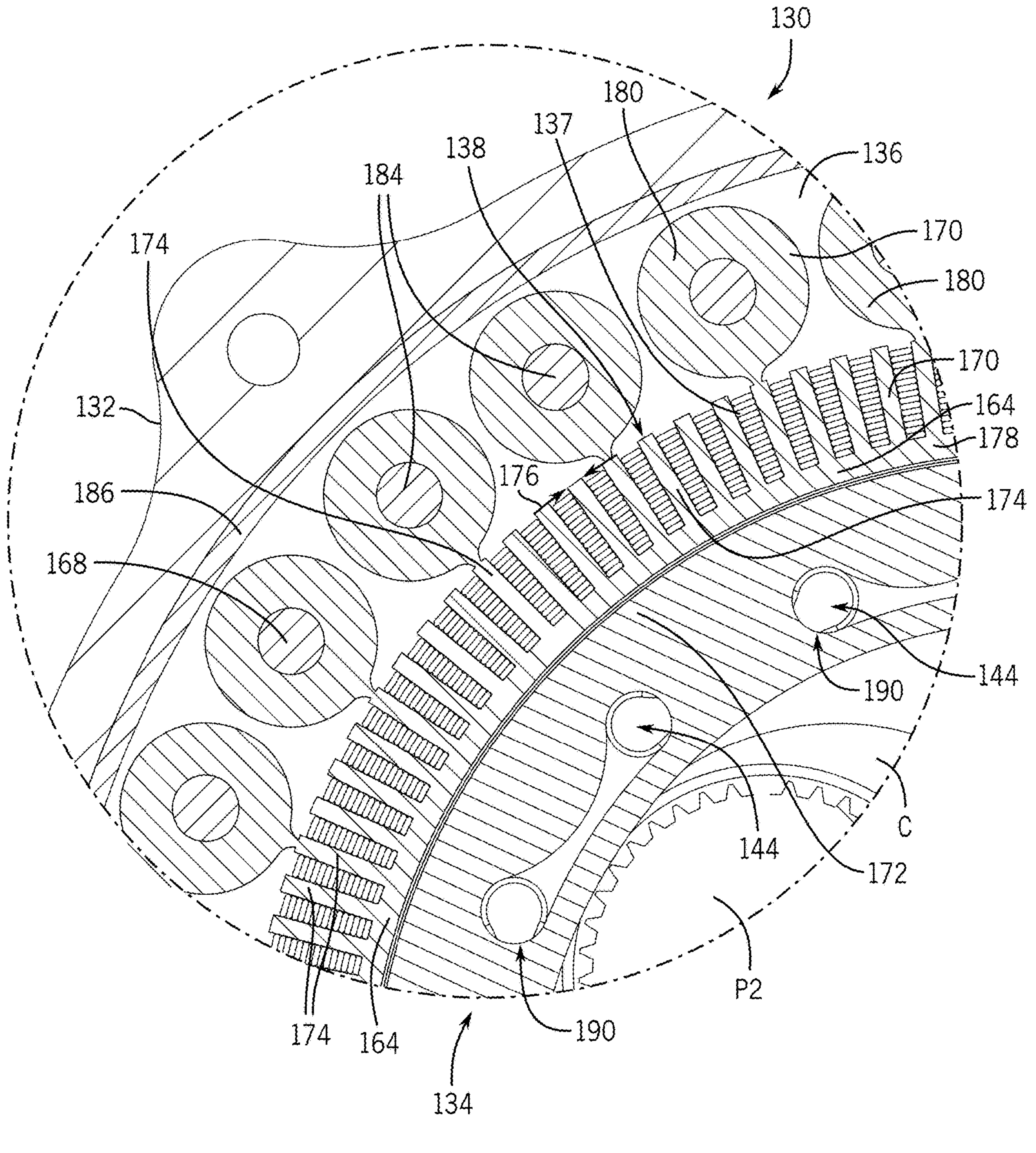
FIG. 11 is an enlarged detailed view of FIG. 10.

Referring also to FIGS. 9-11, the electric machine 130 includes an air gap 166 formed between an outer surface of the rotor 134 and an inner surface of the stator assembly 136. The air gap 166 has an annular shape. The electric machine 130 further includes a seal 164 in accordance with an embodiment of the present disclosure. The seal 164 is configured to seal, close, or otherwise reduce or eliminate the flow of oil into the air gap 166. The air gap 166 and the seal 164 are enclosed inside of the housing 132. The terms lubricant, coolant, oil, cooling medium, and any another term for fluid circulated or utilized in the electric machine 130 may be used interchangeably herein. While the examples shown in FIGS. 2-11 discuss a stator and a rotor 134 that includes a planetary arrangement within the rotor, the seal 164 can be applied to seal an air gap 166 between any rotor and stator.

Referring again to FIGS. 3 and 4, the seal 164 is located at each axial side of the rotor 134 and the stator assembly 136 such that two seals 164 are provided. Each seal 164 has an annular body disposed concentrically about the central axis 182. The annular body has a radial ring 170 and an axial ring 178 joined to the radial ring 170 as a unitary part. The radial ring 170 extends in a radial plane intersecting the central axis 182 and the axial ring 178 extends in a direction of the central axis 182. The radial ring 170 extends along or against the stator assembly 136. For example, the radial ring 170 defines an inner surface, where some or all of the inner surface of the radial ring 170 is configured and positioned to abut a radial peripheral surface of the stator assembly 136 and provide a static seal therewith. The radial ring 170 extends over the air gap 166 to reach the rotor 134. The axial ring 178 extends axially along or against the rotor end 172, carrier C, or other portion of the rotor 134. For example, the radial ring 170 and the axial ring 178 each define an inner surface, where some or all of the inner surface of the axial ring 178 is configured and positioned to abut an annular axial peripheral surface of the rotor and provide a sliding seal therewith. The sliding seal and the static seal cooperate to provide a liquid-tight seal of the annular air gap 166.

In the illustrated embodiment, the seal 164 is cut and pressed solid spec grade silicone rubber that may be generally arc shaped or circular shaped. The radial ring 170 and the axial ring 178 may both include a first material (e.g., silicon rubber). The axial ring 178 may include a second material that is harder/firmer or more rigid than the first material. For example, the axial ring 178 can be impregnated with a hard seal ring material, such as polyurethane or PEEK to name a non-limiting example. The inner diameter of the axial ring 178 may be slightly smaller in diameter than the rotor end 172, carrier C, or other portion of the rotor 134. This smaller diameter allows for a tight fit against the rotor 134 to form the liquid-tight sliding seal. In at least one aspect, the second material is exposed on the inner surface of the axial ring 178 and rests or abuts against the rotor 134. The first material can then surround the second material while allowing the exposed side to abut against the rotor 134. In at least one aspect, the axial ring 178 includes an annular protrusion 179 extending toward the central axis 182 from the inner surface of the axial ring 178. The annular protrusion 179 can include the second material.

The radial ring 170 includes circumferentially spaced and radially outwardly extending retainers 174. Referring also to FIG. 11, each retainer 174 can be larger in width than a distance 176 between each slot 138. This distance allows the retainers 174 to be tightly compressed between and rest against the windings 137 and/or the stator assembly 136 at each slot 138. In an alternative aspect, the width of the retainer 174 is equal to or less than the distance 176 between each slot 138. This retainer width selection allows the retainers 174 to be compressed between and rest against the windings 137 of the stator assembly 136. In either case, the width of the retainers 174 can be selected to allow the retainers 174 to be pressed against the stator windings 137 and/or stator assembly 136 to seal the slots 138. In at least one aspect, each retainer 174 rests against the stator radially outside of the slot 138 and rests against windings 137 on the sides of the slot 138. In at least one alternative aspect, each retainer 174 rests against the stator inside of the slot 138 at a radial bottom of the slot 138 and rests against windings 137 on the sides of the slot 138.

The electric machine 130 and/or the seal 164 can further include one or more seal tensioners 168 configured to apply tension to the seal 164. The seal tensioner 168 can also close, press, couple, or attach the seal 164 to the stator assembly 136. The radial ring 170 further includes circumferentially spaced tabs 180 positioned radially outside of the retainers 174. The tabs 180 support attachment of the seal 164 with the seal tensioner 168. The seal tensioner 168 includes protrusions 184 that mate with the tabs 180. For example, each protrusion 184 can insert into a tab 180 and the seal tensioner 168 can apply tension to the seal 164 helping to keep the seal 164 in position. The tension on the seal 164 can keep the seal 164 from being pulled or moved by the rotation of the rotor 134. The seal tensioner 168 can further include an annular protrusion 186 at the outer radial section of the seal tensioner 168 outside of the protrusions 184. The tabs 180 can rest within the annular protrusion 186. In at least one aspect, the annular protrusion 186 maintains a space for the seal 164 between a portion of the seal tensioner 168 and the stator 136.

When the seal 164 and seal tensioner 168 are installed, the radial ring 170 is positioned against the stator assembly 136, and the protrusions 184 and the annular protrusion 186 are also positioned against the stator assembly 136. The housing 132 presses the seal 164 and seal tensioner 168 against the stator assembly 136. For example, internal ledges 133 of the housing 132 can press the seal tensioner 168 and the seal 164 against the stator assembly 136. In at least one aspect, the thickness of the annular protrusion 186 and protrusions 184 can be the same thickness as the radial ring 170 of the seal 164 or less than the width of the radial ring 170. The thickness can be selected to allow the seal 164 to be pressed firmly against the stator assembly 136 by the housing 132. The seal 164 pressing firmly against the stator assembly 136 forms a liquid-tight static seal.

In at least one aspect, for assembly/installation, the seal 164 is positioned between each winding 137 and the retainers 174 are fed up between each winding 137 prior to impregnation with potting material. The seal tensioner 168 can be attached to the seal 164 to apply tension to the seal 164. The seal tensioner 168 can also press the seal 164 against the stator assembly 136 outside of the end turns of the windings 137. The stator assembly 136 can then be impregnated with potting material. In at least one aspect, the potting material holds the seal 164 in position and the seal tensioner 168 is a backup precaution to keep the seal 164 from moving due to rotation of the rotor 134. In some alterative aspects, the potting material alone can hold the seal 164 in position during rotation of the rotor 134 and a seal tensioner 168 is not needed. After the stator assembly 136 is properly impregnated with the potting material, a short run-in duration with a sacrificial rotor wears away the silicone rubber or other material and potting material from the interface at the axial ring 178 exposing the sealing surface prior to the final rotor 134 being installed to form the electric machine 130. For example, the sealing surface can include the second material that is harder/firmer or more rigid than the first material of the seal 164. In some additional aspects, an additional energizer, such as O-rings, are utilized for sealing and/or other purposes as needed.

The seal 164 forms a liquid-tight seal covering the air gap 166. The liquid-tight seal is formed from a sliding seal between the axial ring 178 and the rotor 134 and a static seal between the radial ring 170 and the stator assembly 136. The radial ring 170 extends over the air gap 166 and also seals the space between the stator windings 137 with the retainers 174. The air gap 166 being covered by a liquid-tight seal allows the electric machine 130 to be flooded, filled, or otherwise lubricated with a cooling fluid (e.g., oil) without the cooling fluid entering into the air gap 166. The seal 164 allows the electric machine 130 to be tilted at any desired angle without worrying about the cooling fluid entering the air gap 166.

The cooling fluid can be pumped through the electric machine 130. For example, the cooling fluid can flow through the rotor 134. The rotor ends 172 can include openings 188 that allow the cooling fluid to enter the rotor 134. The cooling fluid can then enter the cooling channels 144 that allow the cooling fluid to pass through the carrier C. The cooling channels 144 can be positioned near the pockets 142 housing the magnets 135 to help improve cooling of the magnets 135. In at least one aspect, the rotor ends 172 have cooling channels 190 that mate with cooling channels 144 of the carrier C. Referring also to FIGS. 10 and 11, some of the cooling channels 190 connect in each rotor end 172.

Without in any way limiting the scope, interpretation, or application of the claims appearing below, a technical effect of one or more of the example embodiments disclosed herein is a compact, efficient electric machine 130, rotor 134, and seal 164 to improve conversion of electrical current into rotational power and conversion of rotational power into electrical power. The housing 132 and/or overall size of the electric machine 130 is sized and shaped to fit a small package size constraint and provide a cooling solution that allows for the motor and gear box to occupy the same axial space. The present embodiments improve cooling of the electric machine 130 by providing a flooded, filled, or otherwise lubricant-supplied machine with eliminated or reducing lubricant or fluid flowing into or flooding the air gap.

The embodiments of the present disclosure allow for a smaller overall axial package that would allow the machine 130 to fit into more applications. The embodiments incorporate the rotor 134 into the machine 130 such that either axial side of the rotor 134 may include planet gears P1 and planet gears P2 positioned to utilize the planet shaft 156 therebetween. Planet gears P1 at one axial end of the carrier C will be coupled to the sun gear S1 to provide a reaction force for the planetary arrangement 154, and the planet gear P2 are coupled to the sun gear S2 acting as the output in certain embodiments. In at least one aspect, such an arrangement can provide an overall ratio of approximately 1:6.5, and in additional aspects described herein provide ratios in the range from 1:3 to 1:50. Such additional ratios are provided by rearranging a tooth split between the sun gear S1 and the planet gears P1 and the sun gear S2 and the planet gears P2. The present embodiments, especially when utilized with a larger diameter electric machine 130, improve the torque and speed of the electric machine 130 for application requirements related to construction, agricultural, and other work vehicles while maintaining a relatively compact, single assembly and packaging.

The present disclosure further provides embodiments directed to the seal 164 and methods for sealing the air gap 166, such as in an embodiment of a relatively low speed electric machine, to reduce, eliminate, or prevent oil ingress into the air gap 166. The seal 164 and related methods further provide improved efficiency and function to the electric machine 130 while removing any problems related to lubricant flooding. The combination of the potting material and the seal 164 of one or more embodiments provides an oil-proof gap seal to allow the air gap 166 to maintain proper cooling. The rotor 134 and end turns of the windings 137 are then flooded in the illustrated embodiment with the cooling medium to allow for maximized cooling effect while still maintaining the clear air gap 166 for maximum efficiency.

The present embodiments further allow for a more flooded electric machine 130, thereby allowing for greater cooling of the end turns of the windings 137. By providing a more free, open flow of cooling lubricant into the electric machine 130, greater cooling is achieved. Additionally, in some aspects, chemical soluble tubing can be used to the middle of the top of the end turns while flooding the bottom half of the end turns. The chemical soluble tubing can be used to place cooling passages in the potting material. For example, the cooling passages can be formed via an initial application of chemically soluble tubing material adjacent to the stator winding end-turns, with the potting material then applied over the end-turns and the chemically soluble tubing material. Subsequent to application of the potting material, the chemically soluble tubing material can be dissolved so as to form a cooling passage in the potting material that defines a cooling circuit through which cooling liquid can circulated to provide cooling to the stator winding end-turns.

Sealing with the seal 164 keeps the cooling liquid out of the air gap and allows proper cooling of the magnets 135 of the rotor 134 through cooling channels 144 in the rotor 134. The pumping action of the rotor 134 can be used to expel the higher temperature lubricant from the rotor 134 without needing to bring it back to the centerline of the rotor 134. This process reduces the pressure needed to pump cooling fluid into the cooling/lubrication channels 144. This also allows oil/lubricant to be provided at or above the electrical connections of the electric machine 130 ensuring proper cooling for the connections without any additional need for spray jets to cool the connectors.

Further, the embodiments of the present disclosure provide the proper torque and speed for all disclosed applications without the need for an additional gear box. This can improve the power density by volume of the electric machine 130.

In some aspects, the fixed sun gear S1 provides a reaction force for the planetary arrangement 154 and the sun gear S2 to be the output. Further, the planetary arrangement 154 is provided without a ring gear in one or more aspects. Still further, in at least one aspect, the present disclosure provides the first planetary gear set 160 at a first side of the carrier C and the second planetary gear set 162 at a second, opposite side of the carrier C. Still further, the carrier C of at least one aspect may be described as being between the first planetary gear set 160 and the second planetary gear set 162 while also surrounding, enclosing, and/or being located radially and/or axially outside of both the first planetary gear set 160 and the second planetary gear set 162 when the carrier C is considered to include the rotor ends 172.

As used herein, "e.g." is utilized to non-exhaustively list examples and carries the same meaning as alternative illustrative phrases such as "including," "including, but not limited to," and "including without limitation." Unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Terms of degree, such as "generally", "substantially" or "approximately" are understood by those of ordinary skill to refer to reasonable ranges outside of a given value or orientation, for example, general tolerances or positional relationships associated with manufacturing, assembly, and use of the described embodiments.

While the above describes example embodiments of the present disclosure, these descriptions should not be viewed in a limiting sense. Rather, other variations and modifications may be made without departing from the scope and spirit of the present disclosure as defined in the appended claims.

Although the present disclosure has been described with reference to example implementations, workers skilled in the art will recognize that changes may be made in form and detail without departing from the spirit and scope of the claimed subject matter. For example, although different example implementations may have been described as including features providing one or more benefits, it is contemplated that the described features may be interchanged with one another or alternatively be combined with one another in the described example implementations or in other alternative implementations. The present disclosure described with reference to the example implementations and set forth in the following claims is manifestly intended to be as broad as possible. For example, unless specifically otherwise noted, the claims reciting a single particular element also encompass a plurality of such particular elements. The terms "first", "second", "third" and so on in the claims merely distinguish different elements and, unless otherwise stated, are not to be specifically associated with a particular order or particular numbering of elements in the disclosure. Although portions of the disclosure may use the phrase “at least one” or “one or more” of a particular component or element, unless otherwise specifically limited, the mere recitation of a single element or component does not preclude a plurality of such elements or components.

What is claimed is:

1. A gap seal for an electric machine having a rotor rotatable about a rotation axis and separated from a stator by an annular gap, the gap seal comprising an annular body disposed concentrically about the rotation axis, the annular body defining a radial ring and an axial ring joined to the radial ring as a unitary part, the radial ring extending in a radial plane intersecting the rotation axis and the axial ring extending in a direction of the rotation axis, the radial ring and the axial ring each defining an inner surface, some or all of the inner surface of the axial ring is configured and positioned to abut an annular axial peripheral surface of the rotor and provide a sliding seal therewith, and some or all of the inner surface of the radial ring is configured and positioned to abut a radial peripheral surface of the stator and provide a static seal therewith, wherein the sliding seal and the static seal cooperate to provide a liquid-tight seal of the annular gap.

2. The gap seal of claim 1, wherein the radial ring comprises a first material, and wherein the axial ring comprises the first material and a second material surrounded by the first material.

3. The gap seal of claim 2, wherein the second material abuts against the annular axial peripheral surface of the rotor.

4. The gap seal of claim 2, wherein the second material is more rigid than the first material.

5. The gap seal of claim 1, wherein the radial ring further comprises retainers, wherein the retainers are circumferentially spaced around the radial ring and extend away from the radial ring.

6. The gap seal of claim 5, wherein the stator comprises circumferentially spaced windings, wherein the windings define slots between the windings, and wherein the retainers are positioned between the windings to seal the slots between the windings.

7. The gap seal of claim 6, wherein a potting material is impregnated onto the windings and the retainers.

8. The gap seal of claim 5, wherein the radial ring further comprises circumferentially spaced tabs positioned radially outside of the retainers.

9. The gap seal of claim 8, wherein the electric machine further comprises a seal tensioner, wherein each tab is mechanically coupled to the seal tensioner, and wherein the seal tensioner keeps the gap seal in position covering the annular gap during rotation of the rotor.

10. The gap seal of claim 1, wherein the gap seal is enclosed inside the electric machine.

11. The gap seal of claim 1, wherein the electric machine further comprises a cooling fluid being pumped through the rotor and the gap seal keeps the cooling fluid out of the annular gap.

12. An electric machine comprising:

a housing;

a stator positioned within the housing a rotor positioned within the housing and separated from the stator by an annular gap, the rotor rotatable about a rotation axis; and a gap seal comprising an annular body disposed concentrically about the rotation axis, the annular body defining a radial ring and an axial ring joined to the radial ring as a unitary part, the radial ring extending in a radial plane intersecting the rotation axis and the axial ring extending in a direction of the rotation axis, the radial ring and the axial ring each defining an inner surface, some or all of the inner surface of the axial ring configured and positioned to abut an annular axial peripheral surface of the rotor and provide a sliding seal therewith, and some or all of the inner surface of the radial ring configured and positioned to abut a radial peripheral surface of the stator and provide a static seal therewith, wherein the sliding seal and the static seal cooperate to provide a liquid-tight seal of the annular gap.

13. The electric machine of claim 12, wherein the radial ring comprises a first material, wherein the axial ring comprises the first material and a second material surrounded by the first material, and wherein the second material abuts against the rotor.

14. The electric machine of claim 13, wherein the second material is more rigid than the first material.

15. The electric machine of claim 12, wherein the radial ring further comprises retainers, wherein the retainers are circumferentially spaced around the radial ring and extend away from the radial ring, wherein the stator comprises circumferentially spaced windings, wherein the windings define gaps between the windings, and wherein the retainers are positioned between the windings to seal the gaps between the windings.

16. The electric machine of claim 15, wherein a potting material is impregnated onto the windings and the retainers.

17. The electric machine of claim 15, wherein the radial ring further comprises circumferentially spaced tabs positioned radially outside of the retainers.

18. The electric machine of claim 17, further comprising a seal tensioner, wherein each tab is mechanically coupled to the seal tensioner, and wherein the seal tensioner keeps the gap seal in position covering the annular gap during rotation of the rotor.

19. The electric machine of claim 12, further comprising a cooling fluid being pumped through the housing, and wherein the gap seal keeps the cooling fluid out of the annular gap.

20. The electric machine of claim 12, wherein the gap seal is positioned on a first end of the rotor, and wherein the electric machine further comprises a second gap seal positioned on a second end opposite the first end, the second gap seal comprising a second annular body disposed concentrically about the rotation axis, the second annular body defining a second radial ring and a second axial ring joined to the second radial ring as a second unitary part, the second radial ring extending in the radial plane and the second axial ring extending in the direction of the rotation axis, the second radial ring and the second axial ring each defining a second inner surface, some or all of the second inner surface of the second axial ring configured and positioned to abut a second annular axial peripheral surface of the rotor and provide a second sliding seal therewith, and some or all of the second inner surface of the second radial ring configured and positioned to abut a second radial peripheral surface of the stator and provide a second static seal therewith, and wherein the second sliding seal and the second static seal cooperate to provide a second liquid-tight seal of the annular gap.

* * * * *